Jan. 3, 1967 L. G. KILMER 3,295,630
CARRIER VEHICLE FOR SEISMIC WAVE GENERATOR
Filed Nov. 6, 1963 5 Sheets-Sheet 1
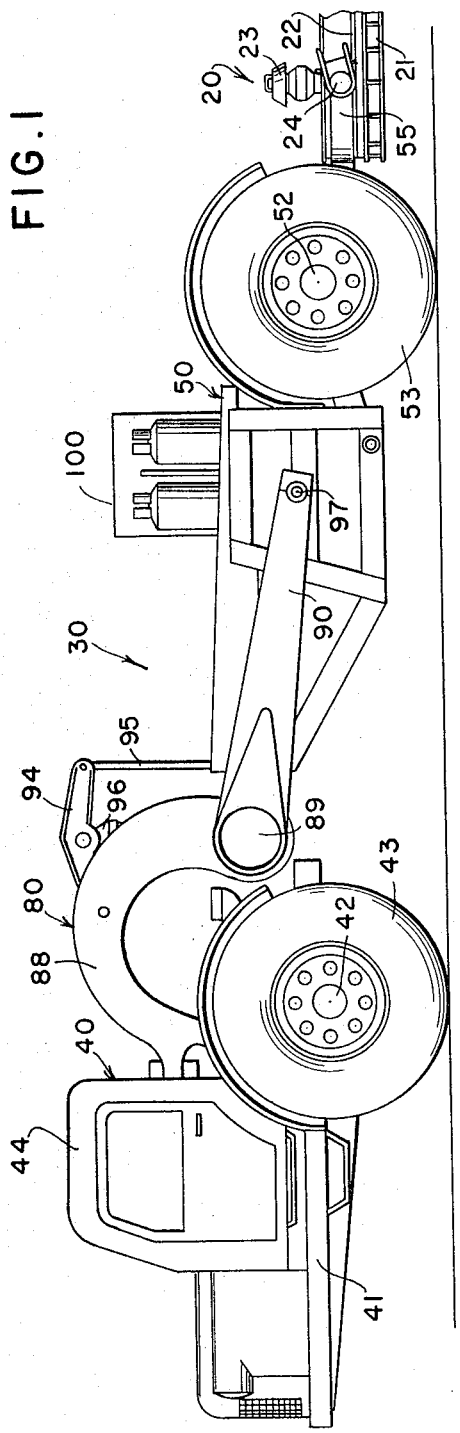
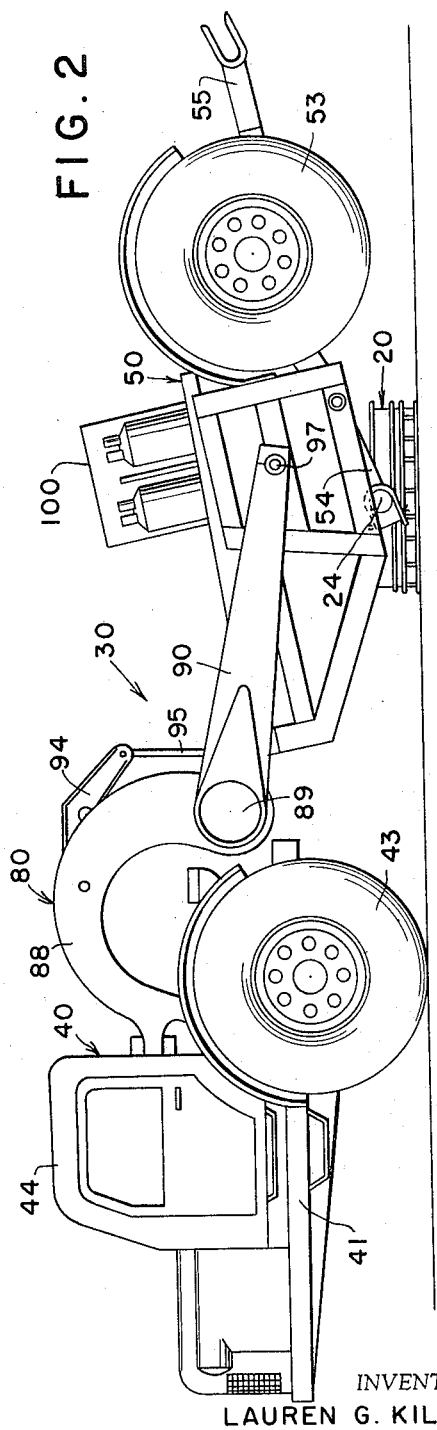
INVENTOR.
LAUREN G. KILMER
BY
*McLean and Boustead*
ATTORNEYS Jan. 3, 1967    L. G. KILMER    3,295,630
CARRIER VEHICLE FOR SEISMIC WAVE GENERATOR
Filed Nov. 6, 1963    5 Sheets-Sheet 2
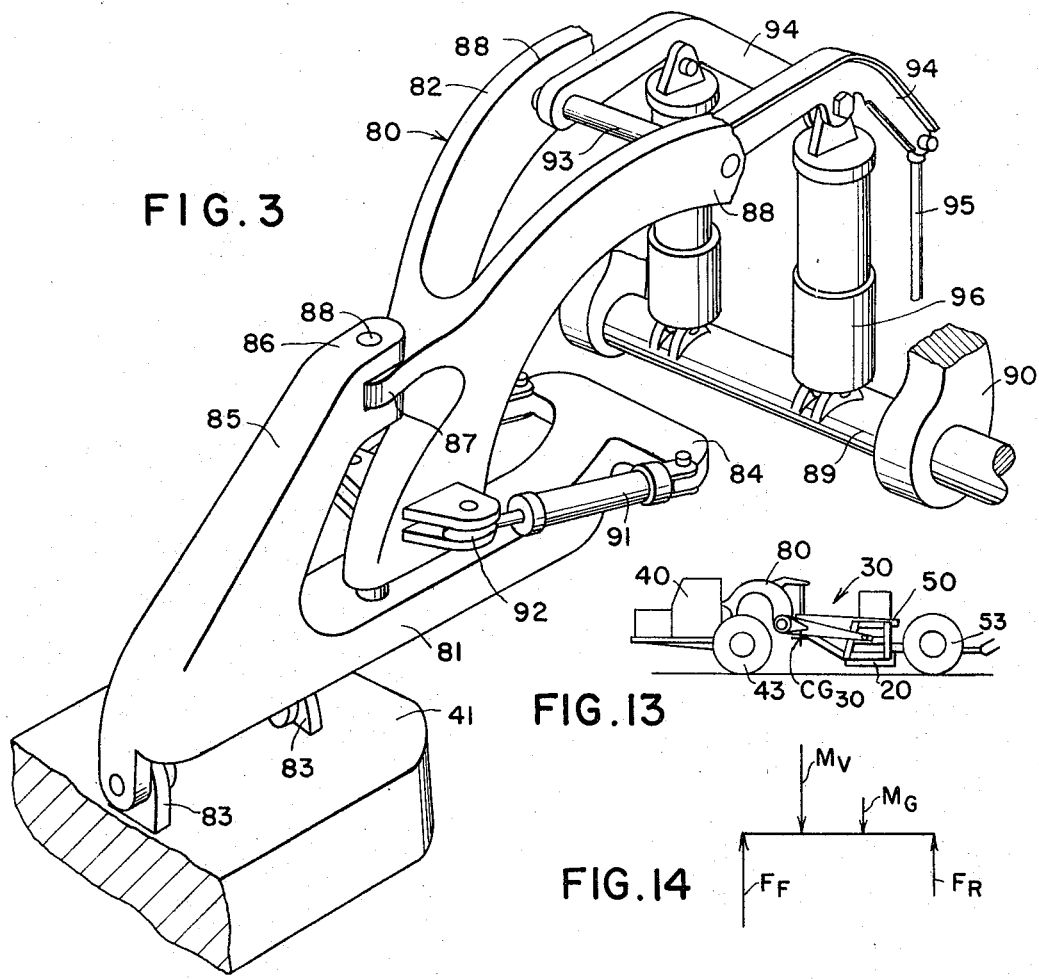
INVENTOR.
LAUREN G. KILMER
BY
McLean and Boustead
ATTORNEYS

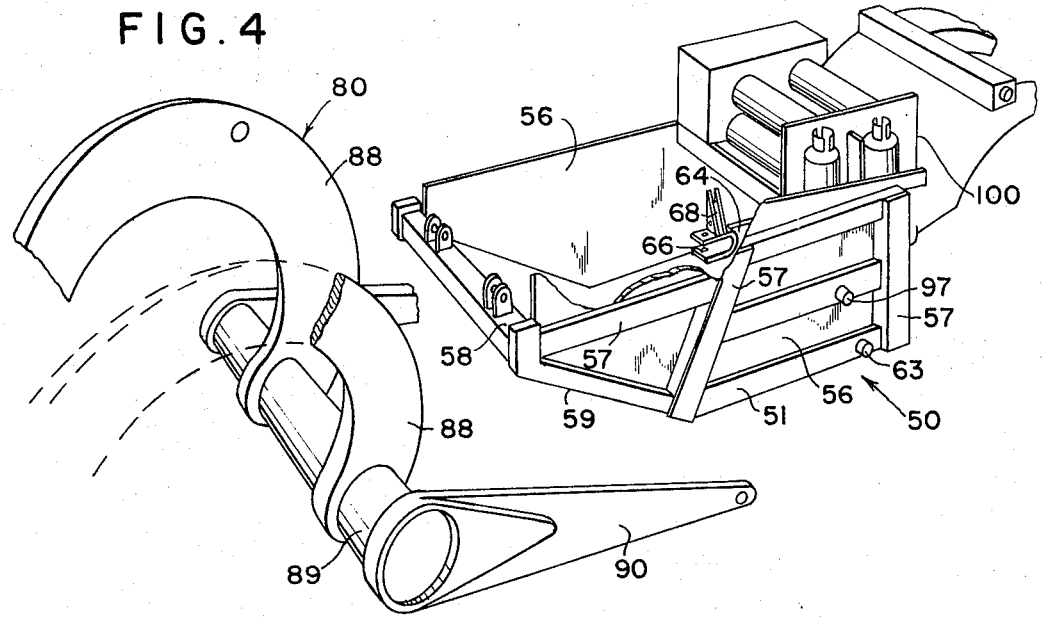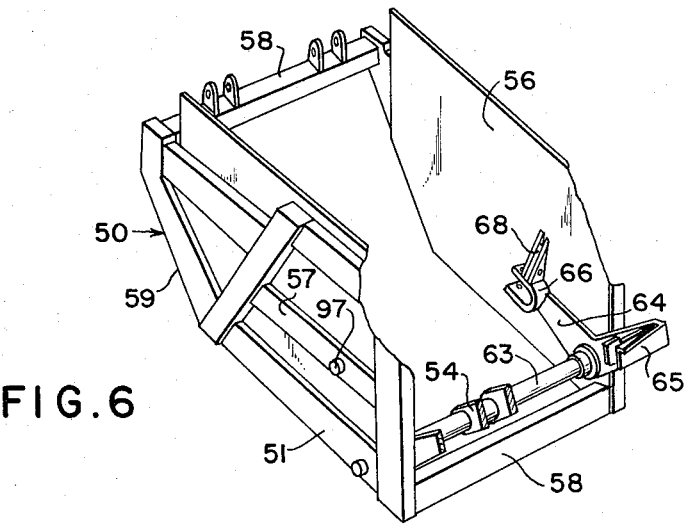

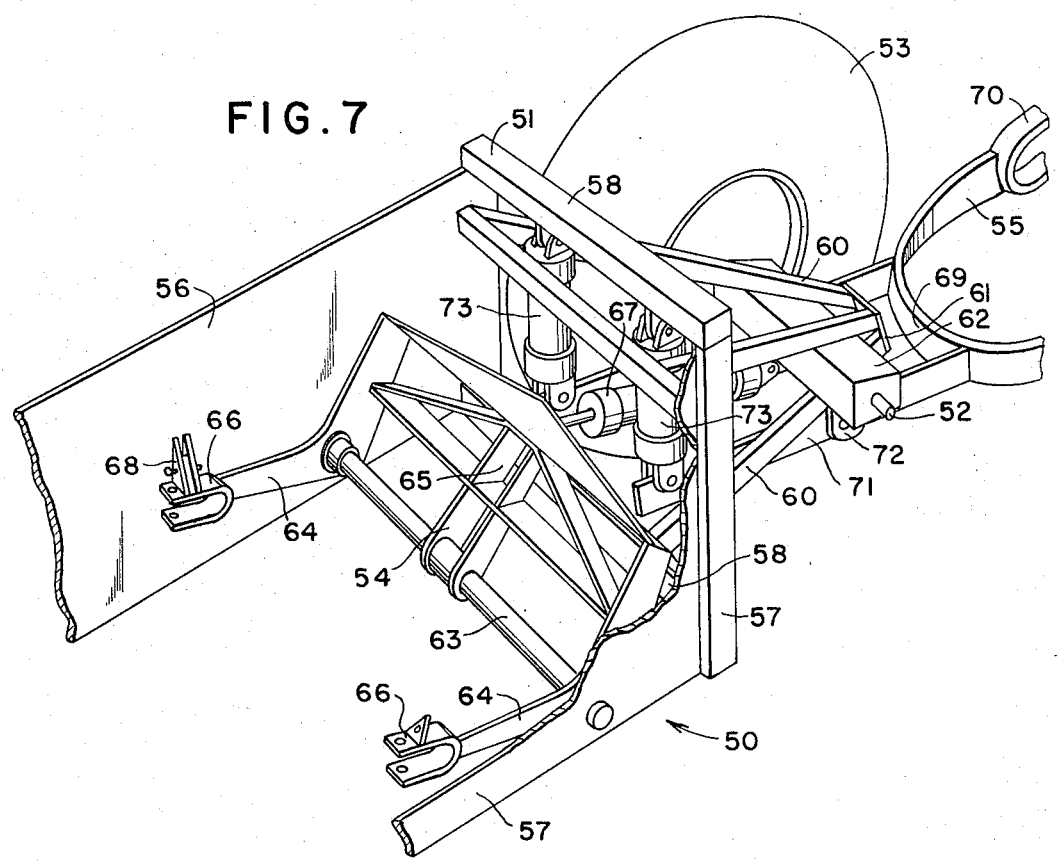

Jan. 3, 1967 L. G. KILMER 3,295,630
CARRIER VEHICLE FOR SEISMIC WAVE GENERATOR
Filed Nov. 6, 1963 5 Sheets-Sheet 5
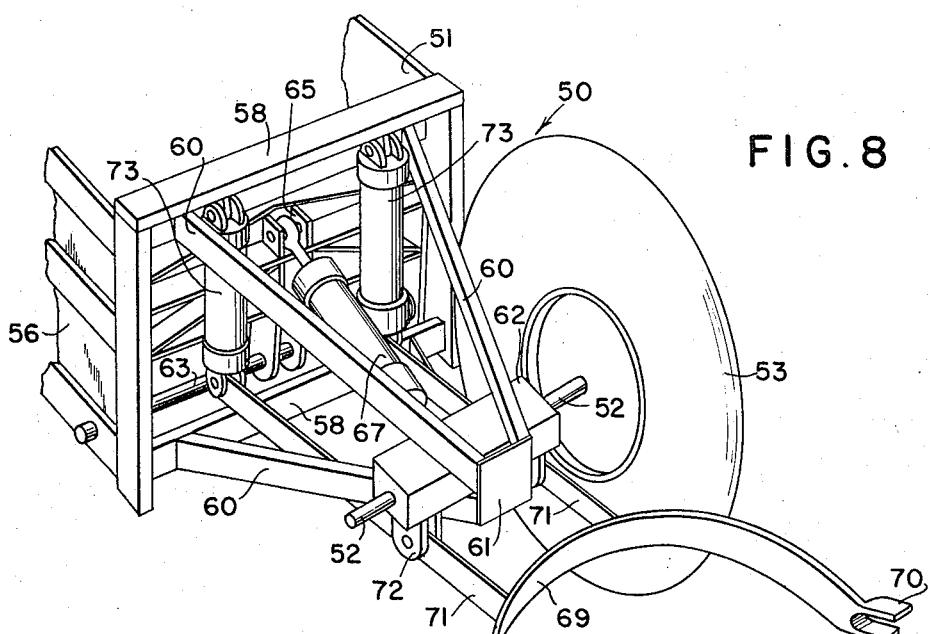
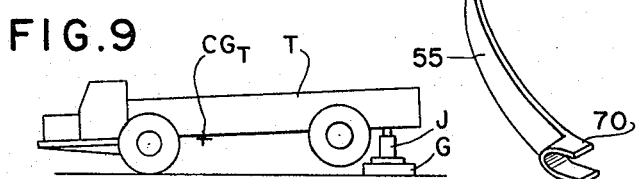
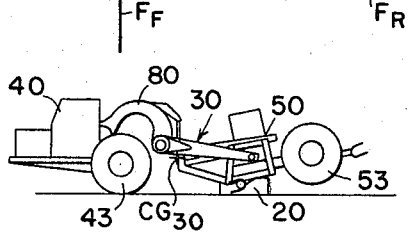
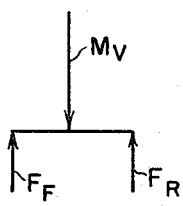
INVENTOR.
LAUREN G. KILMER
BY
McLean and Boustead
ATTORNEYS

3,295,630
CARRIER VEHICLE FOR SEISMIC WAVE GENERATOR
Lauren G. Kilmer, Tulsa, Okla., assignor to Sinclair Research, Inc., New York, N.Y., a corporation of Delaware
Filed Nov. 6, 1963, Ser. No. 321,743
10 Claims. (Cl. 181—.5)

My invention relates to seismic prospecting and in particular is directed to the generation of seismic waves by earth impactors, i.e., devices for converting external energy at the earth-air interface into seismic energy, which require the superposition of substantial mass for efficient coupling with the ground, as, for example, gas exploders and mechanical vibrators.

In the earth impactors employed in seismic prospecting with which the present invention is concerned, the seismic wave is initiated by an impact at the surface of the earth generated by a device resting on the ground. It is evident that the device producing the impact must be properly coupled with the earth in order to obtain maximum conversion of the energy released by the device into seismic energy. Generally the earth-impactor devices which are used at this time are not readily transportable and require reasonably heavy moving equipment in order that they can be moved from place to place.

It is accordingly an object of my invention to provide a device the mass of which can be utilized to aid in the coupling of the earth-impactor type seismic wave generator with the earth and at the same time which can serve as a vehicle for transporting the generator from station to station during periods of use and across both rough terrain and on the highway from one point of use to another.

In accordance with this general object it is a more specific object of my invention to provide such a device in which maximum efficiency in utilization of the mass of the device to weight down the seismic wave generator is achieved while at the same time proper advantage of uniform load distribution for highway traffic is obtained while transporting the device. At the same time it is an object of my invention to provide such a device in which the seismic wave generator can be rapidly moved from point to point and by which the seismic wave generator can be rapidly transferred between its position when in use and its position for transportation.

In accordance with these and other objects of my invention which will become apparent hereinafter, I provide a wheeled vehicle which has a seismic wave generator support arrangement permitting engagement of the seismic wave generator between forward supporting wheels and rear supporting wheels which is capable of moving the generator aproximately vertically such that the generator can be lifted clear of the ground or can be positioned down on the ground as a support for the vehicle lifting one set of wheels of the vehicle above the ground such that the vehicle rests on the other set of wheels and the seismic wave generator.

I am aware that there has been heretofore suggested to position the end of a vehicle, such as a truck, adjacent an earth-impactor type seismic generator and by means of a jack arrangement to elevate such end of the truck supported on the generator, thereby to place part of the weight of the truck on the generator. In such instances, however, the generator is not located between the sets of wheels of the truck but at one end of the truck, that end being the rear end of the truck. This arrangement has the disadvantage that, since the center of gravity of the unloaded truck is normally located at some point close to the front of the truck just behind the forward wheels of the truck, only a small fraction of the weight of the truck is supported on the generator and maximum efficiency in employing the truck as a mass on top of the earth-impactor is not achieved.

In accordance with my invention the vehicle is designed to permit support of the generator forward of the rear wheels of the vehicle such that it may be closely positioned beneath the center of gravity of the vehicle thereby permitting maximum efficiency in use of the mass of the vehicle to aid in coupling the seismic wave generator to the ground.

Another aspect of my invention I contemplate such a vehicular mass for superposition on an earth-impactor type seismic wave generator in which further provision is made for a second generator supporting arrangement to the rear of the vehicle. As suggested above in most wheeled, automotive vehicles which are suitable for transporting a heavy device such as a gas exploder, mechanical vibrator or other similar seismic wave source, the center of gravity of the vehicle itself is located generally forwardly such that the weight distribution of the unloaded vehicle is primarily on its forward wheels.

As postulated above it is desirable in accordance with my invention that the operating support for the generator be positioned between the forward and rear wheels. Such an arrangement, however, while desirable in obtaining maximum utilization of the mass of the truck during operation of the earth-impactor type seismic wave generator and while convenient in moving the generator from one position to a second position close to the first, is disadvantageous in long distance hauling of the generator in that it increases the loading on the forward wheels of the vehicle almost as much as the rear wheels, thus emphasizing the uneven load distribution of the vehicle to a point at which the loading on the front wheels may exceed practical limits for highway use. Thus I further contemplate that a second generator supporting device be provided at the rear of the vehicle in order that during highway transportation the generator can be repositioned to the rear of the vehicle to provide more uniform distribution of the load. By so balancing the load for highway use, the combined weight of the vehicle and generator can be selected up to the maximum practical loading on each set of wheels.

In still another aspect of my invention I contemplate such a device in which shifting of the generator from transporting to operating position is readily facilitated without the need of constructing a low generator to clear beneath axles of the vehicle or constructing a vehicle with unusual axle arrangements to permit clearing the generator. In accordance with this aspect of my invention I provide a wheeled vehicle in which there is an articulated connection between a forward portion of the vehicle on which a forward set of wheels are located and a rear portion of the vehicle on which a rear set of wheels are located. An arrangement is used to permit controlled movement of the forward portion relative to the rear portion at least about a vertical axis such that the vehicle can be "jack-knifed" between the front and the rear portions of the vehicle.

In this aspect of my invention the rear portion of the vehicle is constructed to provide a housing for the seismic generator operating support which is located forwardly with respect to the rear set of wheels and in the rear portion of the vehicle. Thus the front and the bottom of the rear portion of the vehicle are open and the generator operating support is located in such opening to permit the vehicle while jack-knifing to be brought into position over the seismic wave generator resting on the ground such that the generator can be received in the generator support which then engages the generator and lifts it above the ground to permit the vehicle to be then manipulated to a position where it is desired to use the seismic wave generator.

In this manner a vehicle in accordance with my invention transporting an earth-impactor type seismic wave generator having a generator transporting support located on the rear of the vehicle can be stopped, setting down the generator and releasing it on the ground and then can be manipulated to transfer the generator to the operating support with minimum loss of time.

For a more complete understanding of the practical application of my invention reference is made to the appended drawings in which:

FIGURE 1 is a side elevation of a seismic wave generator being transported by a wheeled vehicle in accordance with my invention;

FIGURE 2 is a view similar to FIGURE 1 showing the seismic wave generator in operating position in which the mass of the vehicle is superposed on the generator to couple it with the ground;

FIGURE 3 is a fragmentary perspective view of a portion of the vehicle shown in FIGURES 1 and 2;

FIGURE 4 is another fragmentary perspective view of another portion of the vehicle shown in FIGURES 1 and 2;

FIGURE 5 is a further fragmentary perspective view of still another portion of the vehicle shown in FIGURES 1 and 2;

FIGURE 6 is a fragmentary perspective view of the same portion of the vehicle seen in FIGURE 5 but from a different angle of sight;

FIGURE 7 is yet a further fragmentary perspective view of another portion of the vehicle shown in FIGURES 1 and 2;

FIGURE 8 is a fragmentary perspective view of the same portion shown in FIGURE 7 but seen from a different angle of sight;

FIGURE 9 is a schematic side elevation illustrating a prior art device;

FIGURE 10 is a vectoral diagram analyzing the device shown in FIGURE 9;

FIGURE 11 is a schematic side elevation of a vehicle and seismic wave generator constructed in accordance with my invention shown in operating position;

FIGURE 12 is a vectoral diagram analyzing the arrangement shown in FIGURE 11;

FIGURE 13 is a side elevation of a vehicle and seismic wave generator shown in one transporting position in accordance with my invention;

FIGURE 14 is a vectoral diagram analyzing the arrangement shown in FIGURE 13;

FIGURE 15 is a side elevation of a vehicle and seismic wave generator shown in another transporting position in accordance with my invention; and FIGURE 16 is a vectoral diagram analyzing the arrangement shown in FIGURE 15.

Referring more particularly to FIGURES 1 and 2 the reference number 20 designates a seismic wave generator, while the numeral 30 designates a four wheeled vehicle in accordance with my invention, intended, as shown in FIGURE 1, to transport seismic wave generator 20 from place to place and, as shown in FIGURE 2, to superpose a substantial portion of its mass on generator 20 when the latter is used to initiate a seismic wave.

Although the specific construction of generator 20 forms no part of my present invention, and generator 20 can be any suitable gas exploder, mechanical vibrator or other earth-impactor type seismic wave generator requiring a substantial mass resting on it for proper coupling with the earth, the illustrated generator 20 is the specific gas exploder described in more detail in my copending application Serial No. 314,230, filed October 7, 1963, which is designed to receive an explosive charge of gases, such as a stoichiometric mixture of oxygen and propylene and to ignite such charge, confining the resultant explosion in a manner such that a substantial part of the force of the explosion is converted into seismic energy.

Generator 20 is constructed, such that its bottom 21 is relatively movable with respect to its top 22 by relative movement at the joint between their sides, which joint, however, is sealed to prevent lateral escape of exploding gases, these being exhausted through an upright stack 23 designed to muffle the sound of the escaping gases. In order to secure proper coupling of the impact of the explosion within generator 20 with the ground on which generator 20 rests, a substantial weight should be imposed on top 22.

In accordance with my present invention vehicle 30 is designed to impose such a weight on generator 20, as illustrated in FIGURE 2, and also to carry generator 20, as illustrated in FIGURE 1. To this end generator 20, which has a low generally cylindrical construction, is further provided with a pair of short horizontal stub shafts 24 which project outwardly from top 22 of generator 20 diagonally opposite each other. Thus any forked device arranged to receive the pair of shafts 24 while clearing the remaining structure of generator 20 can be utilized to pick generator 20 up from the ground or to impose a downward force on generator 20, such force being exerted on top 22 of generator 20.

Basically vehicle 30 includes a forward tractor 40 and a rear carrier 50 which are interconnected by a hitch 80.

Tractor 40 includes a horizontal frame, i.e. bed 41 carrying on its underside an axle 42 on the ends of which are mounted a pair of wheels 43 positioned on opposite sides of bed 41. Axle 42 is suitably provided with reduction gearing in its connections with wheels 43, steering brakes for each wheel 43 independent of those for the other wheel 43 and a differential connection to an engine mounted on the forward portion of bed 41, positioned to the left of wheels 43 in FIGURES 1 and 2. A cab 44 can be provided on bed 41 for enclosing the operating controls and the operator, and bed 41 further carries suitable hydraulic pumps, accumulators and the like with their associated controls to permit operation of the various components of vehicle 30 later described. Bed 41 as described more specifically with reference to FIGURE 3 is suitably constructed at its rear over axle 42 to receive hitch 80.

Carrier 50 has a rigid frame 51 constructed of channels and plates, as more specifically described with reference to FIGURES 5–8, and a pair of stub axles 52 laterally mounted on opposite sides of frame 51 adjacent the rear of carrier 50, and carrying a pair of wheels 53 disposed on opposite sides of frame 51. Forwardly of wheels 53 the underside of carrier 50 is open at its front end and frame 51 is free of any cross obstructions interfering with such opening except on the upper portion of frame 51 such that frame 51 forms a box-like structure, having only side walls and cross members at its rear and top, in which a forward generator support fork 54 is mounted. To the rear frame 51 further carries a second generator support fork 55 projecting from the rear of carrier 50 behind wheels 53.

Referring more particularly to FIGURES 5 and 6 the forward portion of frame 51 includes a pair of vertical side plates 56 which extend lengthwise and are positioned parallel to each other to define the opposite sides of the forward portion of carrier 50. Plates 56 are preferably reinforced exteriorly by the employment of channels 57 welded to plates 56 with their open sides toward plates 56. Plates 56 are held in parallel relationship by means of heavy cross beams 58 extending between the forward upper corners of plates 56 and across the upper and lower of rear corners of plates 56. Generally the forward lower corner of each plate 56 is cut-off as indicated by the reference number 59.

The rear portion of frame 51 is generally defined by four beams 60 (see particularly FIGURES 7 and 8) a pair of which are secured at their forward ends near the outer ends of a beam 58 joining the upper rear corners of plates 56 and the other pair of which are secured at their forward ends close to the ends of a beam 58 joining the lower rear corners of plates 56. The rear ends of beams 60 are brought together and secured in a rectangular plate 61 and retain between them a horizontally positioned axle box 62 located just forward of plate 61. Stub axles 52 referred to above are mounted on opposite ends of axle box 62.

Referring to FIGURES 6 and 7 forward fork 54 is mounted on a shaft 63 journaled for rotation at its opposite ends in plates 56 near their lower rear corners just forward of the beam 58 joining such corners, such that shaft 63 extends horizontally across the lower rear portion of the enclosure formed by plates 56 forward of wheels 53. Fork 54 is composed of a pair of cranks 64 the centers of which are affixed to opposite ends of shaft 63 to rotate with shaft 63. Cranks 64 are aligned relative to each other and are joined at their ends which extend upwardly between plates 56 by a framework 65 also secured to shaft 63 such that the entire assembly of fork 54 can move as a unit about the axis of shaft 63. The forward arm of each crank 64 extends closely adjacent the inside of a plate 56 and terminates at its forward end in a clevis 66.

A double acting jack 67 (see FIGURES 7 and 8) pivotally secured at its rear end to framework 51 beneath axle box 61 is pivotally secured at its forward end to the center of framework 65 at a point remote from shaft 63. The disposition of jack 67 is such that it can be extended to position in which the upper portion of framework 65 is moved forward thereby lowering the forward ends of cranks 64 and hence dropping clevises 66 downwardly through the opening defined in the underside of carrier 50 between side plates 56. When jack 67 is retracted, the forward ends of cranks 64 are raised up between side plates 56. Because of the proximity of cranks 64 to side plates 56 suitable fastening arrangements can be provided, such as indicated by the reference number 68, for pinning each clevis 66 to the side of the adjacent side plate 56 in order to prevent accidental lowering of fork 54, for example when travelling on the highway.

Rear fork 55 includes a semi-circular beam 69 the ends of which carry clevises 70, similar to clevises 66 and similarly spaced, as will be apparent, to receive stub shafts 24 on a generator 20. A pair of longitudinally and horizontally disposed parallel beams 71 are affixed at their rearward ends to beam 69 intermediate the ends of beam 69. Intermediate their ends beams 71 extend beneath the lower frame members 60 and are pivotally secured to the underside of axle box 61, as indicated by the reference number 72 for rotation about a horizontal axis aligned with and beneath that of stub axles 52. The forward end of each beam 71 is pivotally secured to the lower end of a one of a pair of double acting jacks 73, the upper end of which is pivotally secured to a beam 58 connecting the upper rear corners of side plates 56. Jacks 73 have a retracted position in which clevises 70 are lowered with respect to carrier 50 sufficiently to receive stub shafts 24 of a generator 20 resting on the ground behind carrier 50. When extended jacks 73 force the forward ends of beams 71 downwardly to receive fork 55 such that a generator 20, the shafts 24 of which are received in clevises 79, will be lifted clear of the ground for transporting on the highway.

Referring to FIGURES 1 and 2 hitch 80 is mounted on bed 41 of tractor 40 over axle 42 such that it is free to rotate horizontally on an axis extending lengthwise of and centered between wheels 43 with respect to tractor 40 and through suitable jacks described more specifically with reference to FIGURE 3 can be controlled to rotate about a second axis perpendicular to and intersecting such horizontal axis. Such second axis is normally vertical when wheels 43 and 53 all rest on a common plane. Hitch 80 is further secured to frame 51 of carrier 50 at the rear end of hitch 80 such that carrier 50 is free to rotate about a horizontal axis with respect to hitch 80 disposed forward of and parallel to the axial line of wheels 53. Rotation of carrier 50 with respect to hitch 80 about such axis is under the control of jack and lever arrangements described more particularly with reference to FIGURE 3.

More particularly referring to FIGURE 3 and to FIGURE 4, hitch 80 is composed of two principal parts, a pivot base 81 and a yoke 82. Pivot base 81 referring to FIGURE 3 is formed of a heavy beam positioned horizontally above bed 41 over axle 42 and is pivotally mounted on bed 41, as indicated by the reference numbers 83, to permit the above described rotation of hitch 80 about a horizontal axis centrally and longitudinally disposed with respect to tractor 40.

Base 81 at its rear end is slightly elevated and carries a cross member affixed to it which forms a pair of outstanding wings 84, one on each side of the rear end of base 81. At its forward end base 81 is provided with an upright post 85 slightly canted to the rear which at its upper end defines a clevis 86 for receiving a tongue 87 on yoke 82.

Yoke 82 is composed of a pair of arched frame members 88, a cross beam 89 and a pair of side arms 90. Arched frame members 88 are set on an angle, joined together at their forward ends and spread apart at their rearward ends which are secured, spaced apart, on transverse beam 89 to which they are attached. Arms 90 are attached at their forward ends to opposite outer ends of beam 89 and extend downwardly and rearwardly parallel to each other. Arched frame members 88 where they are jointed together at their forward ends carry tongue 87 and continue downward together terminating in a post pivotally received in base 81 between post 85 and wings 84 to provide a pivotal connection which is rotatable about a vertical axis when post 85 is in its most upright position and which is vertically aligned with a similar pivot pin joining clevis 86 and tongue 87. Thus yoke 82 can oscillate about an axis which is perpendicular to the horizontal axis of rotation of base 81 on bed 41. The structure is so formed to permit forming more than 90° oscillation of yoke 82 horizontally to either side of base 81 from its normal rearwardly extended position.

A pair of double acting jacks 91, one located on each side of hitch 80, are employed to control the rotational movement of yoke 82 with respect to base 81. Thus a jack 91 is pivotally secured at one end to the outer end of each wing 84 and at its other end is pivotally secured, as indicated by the reference number 92, to structure secured to the adjacent side of an arch frame member 88 at the forward end of such frame member where it is joined to the other frame member 88 between the pivotal connection of tongue 87 with post 85 and the pivotal connection of frame members 88 in base 81.

The upper portions of arch frame members 88 where they are spaced from each other intermediate their ends carry between them a horizontal, transversely disposed mounting shaft 93 which is secured at each end in a frame member 88 and thus extends between them. A pair of crank arms 94 are mounted between arch frames 88 with their forward ends rotatably received on shaft 93 and with their rear ends pivotally secured to the upper ends of link rods 95 the lower ends of which are pivotally secured to a cross beam 58 joining the upper forward corners of side plates 56 of carrier 50. The centers of crank arms 94 are located physically between frame members 88 and centrally over beam 89. A pair of double acting jacks 96 are vertically positioned between beam 89 to which they are pivotally secured at their lower ends and the centers of cranks 94 to which they are pivotally secured at their upper ends.

Arms 90 extend rearwardly about opposite sides of carrier 50 to which they are secured at their ends remote from beam 89 by pivotal connections 97 mounted in side plates 56 at positions slightly behind the centers of such plates such that pivots 97 are aligned on a horizontal axis extending transversely of carrier 50. It will be apparent, referring particularly to FIGURES 1 and 2, that retraction of jacks 96 pulling the centers of cranks 94 downwardly causes the forward end of carrier 50 to be pushed downwardly relative to beam 89 which is located just forward of the front end of carrier 50. Since arms 90 are rigidly part of hitch 80, the retraction of jacks 96 thus causes carrier 50 to be rotated counter-clockwise, as seen in FIGURES 1 and 2, relative to the transverse horizontal axis on which pivots 97 are located.

In operation when it is desired to employ vehicle 30 to transport a generator, such as generator 20, to a position of use, vehicle 30 is backed up to a generator 20 resting on the ground with clevises 70 of rear fork 55 positioned by operation of jacks 73 above the surface of the ground the same distance as stub shafts 24. Thus as vehicle 30 is backed up to generator 20 clevises 70 receive stub axles 24. In this position stub axles 24 are then secured, for example, by placing chocks in the open ends of clevises 70 and pinning these in position. Thereafter jacks 73 are extended to raise generator 20 above the surface of the ground, and vehicle 30 and generator 20 are then in the position shown in FIGURE 1 suitable for transporting generator 20 to any desired location.

On arriving at such a desired location where generator 20 is to be used to initiate seismic waves, vehicle 30 is maneuvered to locate generator 20 over the desired point of use. Jacks 73 are then retracted lowering rear fork 55 to a position in which generator 20 rests on the ground. Stub axles 24 are then freed of clevises 70, and vehicle 30 is moved forward to release generator 20. Vehicle 30 is then maneuvered to a position alongside generator 20 in which generator 20 is approximately adjacent beam 89 of hitch 80. By manipulating jacks 91 and backing tractor 40 such that carrier 50 and tractor 40 "jack knife" to move the forward open end of carrier 50 in front of generator 20, vehicle 30 is then maneuvered forward to bring carrier 50 into a position over generator 20 with generator 20 between side plates 56 of frame 51. Jack 67 is then extended to lower the forward portion of front fork 54 such that its clevises 66 receive stub shafts 24 of generator 20. Chocks are then positioned and pinned in the open ends of clevises 66 to retain stub shafts 24 seated in clevises 66.

After manipulating jacks 91 to straighten vehicle 30 jacks 96 are retracted to cause carrier 50 to rotate counter-clockwise, as seen in FIGURE 2. Since the center of gravity of vehicle 30 is forward of the position of generator 20 such counter-clockwise rotation of carrier 50 lifts wheels 53 from the ground causing the entire weight of the vehicle to be supported on forward wheels 43 and generator 20. Generator 20 then is fired, for example, in the manner described in my above noted copending applications Serial Nos. 187,111 and 314,230. (In this connection it should be noted that carrier 50 can suitably be employed for housing cylinders of gases used to charge generator 20 which, for example, can be mounted across side plates 56 preferably over the position of generator 20 in order to maximize the weight directly imposed on generator 20. Such a housing for gas storage cylinders is shown in FIGURES 1 and 2 and indicated by the reference numeral 100.)

After firing generator 20 can be returned to position for transportation in rear fork 55 by reversing the procedure described from the transfer from such fork to fork 54. If, however, only small movement of generator 20 to its next location of use is contemplated, when jacks 96 are extended to restore vehicle 30 to its normal position shown in FIGURE 1 (with, however, generator 20 still retained in fork 54) jack 67 can be retracted to lift generator 20 from the ground such that it can be moved to such next position of use by vehicle 30 while retained in forward fork 54.

Referring to FIGURES 9–12, a comparison is indicated illustrating the advantage of using a vehicular mass in accordance with my present invention for aiding in coupling of the generator, such as generator 20, with the ground in which the generator is positioned between a forward set of supporting wheels and a rear set of supporting wheels such that, when the weight of the vehicle is imposed on the generator, one set of wheels, typically the rear set, are elevated throwing the mass of the vehicle on the remaining set of wheels and generator.

Thus referring to FIGURE 9 in which the reference letter T indicates a conventional truck used for carrying a generator G, when it is desired to impose part of the weight of truck T on generator G, the tail of truck T is backed over the generator, and a jack J is employed to elevate the rear wheels of truck T on generator G. Assuming that truck T has an unloaded weight of 26,500 lbs. and a wheelbase between forward and rear axles of 17 feet 10 inches, that jack J is located 4 feet 6 inches to the rear of the rear axle of truck T and that the center of gravity of truck T (denoted by the reference letters $CG_T$) is located 5 feet 6 inches to the rear of the forward axle of truck T, the forward wheels in this case would carry 19,950 lbs. of the weight of truck T while the remaining 6,550 lbs. would be imposed on generator G. These relationships are shown in the diagram in FIGURE 10 in which $M_V$ designates the mass of truck T, $F_F$ designates the weight supported on the forward axle and $F_R$ equals the weight supported at the rear of the vehicle in this case on jack J.

FIGURE 11 shows vehicle 30 and generator 20 as in FIGURE 2, however, drawn on the same scale as FIGURE 9 for comparative purposes with the dimensions between axles and the center of gravity (designated $CG_{30}$) similarly located as in FIGURE 9. In this case generator 20 is positioned forwardly of the rear axle of vehicle 30 a distance of 6 feet 8 inches. As illustrated in FIGURE 12, by reason of the different location of generator 20 the mass of vehicle 30 is supported more evenly between generator 20 and the forward wheels of vehicle 30. Thus assuming a vehicle 30 having the same weight as truck T the forward axle should carry 13,450 lbs. of the vehicle, while generator 20 would support 13,050 lbs., essentially twice as much as in the case described with reference to FIGURES 9 and 10, thereby greatly reducing the weight of the generator itself required for equivalent coupling with the ground.

Referring to FIGURES 13–16, there is compared in the same manner as with respect to FIGURES 9–12 the effect of the distribution of the weight of generator 20 during its transportation between a position in which generator 20 is received in forward fork 54, as shown in FIGURE 13 and analyzed in FIGURE 14, and a position in which generator 20 is retained in rear fork 55, as shown in FIGURE 15 and analyzed in FIGURE 16. In these figures using the same symbols to indicate the same values used with reference to FIGURES 11 and 12, assuming rear fork 55 holds generator 20 centered 4 feet 6 inches behind the rear axle of vehicle 30 and assuming the weight of generator 20 (indicated in FIGURES 14 and 16 as $M_G$) is four tons, the weight supported on the forward axle ($F_F$) in the arrangement of FIGURE 13 is 20,800 lbs. while that supported on the rear axle ($F_R$) is 13,700 lbs. On the other hand in the arrangement shown in FIGURE 15 the forward axle of vehicle 30 supports 16,290 lbs. and the rear axle supports 18,210 lbs. It will be apparent that substantially more uniform weight distribution is achieved in the latter arrangement.

I claim:

1. In the combination of an earth-impactor type seismic wave generator and a vehicular mass for superposition thereon, the improvement in which said vehicular mass is a wheeled vehicle including a forward portion having first supporting wheel means thereon, a rear portion having second supporting wheel means thereon, hitch means connecting said forward and rear portions for providing controlled movement therebetween about a horizontal axis extending transversely of said vehicle and including operator means for moving said portions relative to each other about said axis whereby the forward end of said rear portion is selectively raised and lowered with respect to said forward portion, generator support means engaging said generator and pivotally mounted on said vehicle for movement between positions in which said generator is relatively lower and relatively higher on said vehicle, the center of gravity of the mass of said vehicle not including that of said generator being located and said generator support means being located between said first and said second wheel means, operator means attached to said generator support means for moving said generator to said positions, whereby when said generator is thereby moved to said lower position said rear portion is adapted to pivot and said vehicle is elevated in part and the mass of said vehicle is supported on said first wheel means and on said generator.

2. The vehicular mass of claim 1 wherein said generator support means includes fork means in said opening for supporting said generator journaled at its opposite ends to said frame means and double-acting piston means to raise and lower said fork means and said generator in said opening with respect to said frame means.

3. The vehicular mass of claim 1 wherein said generator support means comprises a fork means in said opening for supporting said generator including a shaft journaled at its opposite ends to said frame means, a pair of cranks each secured at its center adjacent a respective end of said shaft and having a forwardly extending arm adapted to be secured to said generator and a rearwardly extending arm and double acting piston means arranged to pivot said cranks about the axis of said shaft whereby said forwardly extending arms are raised and lowered with respect to said frame means.

4. A vehicular mass for superposition on an earth-impactor type seismic wave generator, in which said vehicular mass is a wheeled vehicle including a forward portion having supporting wheel means thereon, a rear portion having supporting wheel means thereon, an articulated connection between said forward and rear portions, providing for relative rotation between said forward and rear portions about a horizontal axis extending longitudinally of said vehicle and about a vertical axis perpendicular to said horizontal axis and extending through said horizontal axis, first operator means attached to said connection for providing controlled relative movement between said forward and rear portions at least about said vertical axis, frame means in said rear portion of said vehicle defining a forwardly and downwardly facing opening in the underside thereof forwardly located with respect to said wheel means on said rear portion, generator support means mounted on said rear portion of said vehicle positioned in said opening for engaging a said generator and mounted on said rear portion for movement between positions in which a said generator engaged therein is relatively lower and relatively higher on said vehicle, the center of gravity of the mass of said vehicle being located forward of the position of a said generator in said generator support means, and second operator means attached to said generator support means for moving said generator support means to said positions, whereby when a said generator is thereby moved to said lower position said rear portion of said vehicle is elevated and the mass of said vehicle is supported on said wheel means on said forward portion of said vehicle and on said generator.

5. A vehicular mass for superposition on an earth-impactor type seismic wave generator, in which said vehicular mass is a wheeled vehicle including a forward portion having supporting wheel means thereon, a rear portion having supporting wheel means thereon, hitch means connecting said forward and rear portions including an articulated connection between said forward and rear portions, providing for relative rotation between said forward and rear portions about a horizontal axis extending longitudinally of said vehicle and about a vertical axis perpendicular to said horizontal axis and extending through said horizontal axis, first operator means attached to said articulated connection for providing controlled relative movement between said forward and rear portions at least about said vertical axis, frame means in said rear portion of said vehicle defining a forwardly and downwardly facing opening in the underside thereof forwardly located with respect to said wheel means on said rear portion, generator support means mounted on said rear portion of said vehicle positioned in said opening for engaging a said generator and including means pivotally mounted on said rear portion for movement between positions in which a said generator engaged therein is relatively lower and relatively higher on said vehicle, and second operator means attached to said generator support means for moving said generator support means to said positions.

6. A vehicular mass for superposition on an earth-impactor type seismic wave generator, in which said vehicular mass is a wheeled vehicle including forward supporting wheel means thereon, rear supporting wheel means thereon, first generator support means mounted on said vehicle for engaging a said generator and mounted for movement between positions in which said generator is relatively lower and relatively higher on said vehicle, the center of gravity of the mass of said vehicle not including that of said generator being located and said first generator support means being located between said forward and rear wheel means, operator means attached to said generator support means for moving said generator support means to said positions, whereby when a said generator is thereby moved to said lower position said rear portion of said vehicle is elevated and the mass of said vehicle is supported on said wheel means on said forward portion of said vehicle and on said generator, and second generator support means positioned on said vehicle rearwardly located with respect to said wheel means on said rear portion and mounted for movement between a lower and an upper position in which, respectively, a said generator can be received therein when on the surface of the ground and a said generator supported therein can be elevated above the surface of the ground thereby to move the center of gravity of said vehicle when loaded rearwardly of its unloaded position.

7. A vehicular mass for superposition on an earth-impactor type seismic wave generator, in which said vehicular mass is a wheeled vehicle including forward supporting wheel means thereon, rear supporting wheel means thereon, first generator support means mounted on said vehicle for engaging a said generator and mounted on said rear portion for movement between positions in which said generator is relatively lower and relatively higher on said vehicle, the center of gravity of the mass of said vehicle not including that of said generator being located and first generator support means being located between said forward and rear wheel means, and second generator support means positioned on said vehicle rearwardly located with respect to said wheel means on said rear portion and mounted for movement between a lower and an upper position in which, respectively, a said generator can be received therein when on the surface of the ground and a said generator supported therein can be elevated above the surface of the ground thereby to move the center of gravity of said vehicle when loaded rearwardly of its unloaded position.

8. A vehicular mass for superposition on an earth-impactor type seismic wave generator, in which said vehicular mass is a wheeled vehicle including a forward portion having supporting wheel means thereon, a rear portion having supporting wheel means thereon, hitch means connecting said forward and rear portions including an articulated connection between said forward and rear portions providing for relative rotation between said forward and rear portions about a horizontal axis extending longitudinally of said vehicle and about a vertical axis perpendicular to said horizontal axis and extending through said horizontal axis, first operator means attached to said articulated connection for providing controlled relative movement between said forward and rear portions at least about said vertical axis, said hitch means including further connecting means providing controlled movement between said forward and rear portions about a horizontal axis extending transversely of said vehicle, second operator means for moving said forward and rear portions relative to each other about said transverse horizontal axis whereby the forward end of said rear portion is selectively raised and lowered with respect to said forward portion, frame means in said rear portion of said vehicle defining a forwardly and downwardly facing opening in the underside thereof forwardly located with respect to said wheel means on said rear portion, generator support means mounted on said rear portion of said vehicle positioned in said opening for engaging a said generator and mounted on said rear portion for movement between positions in which a said generator engaged therein is relatively lower and relatively higher on said vehicle, and third operator means attached to said generator support means for moving said generator support means to said positions.

9. The vehicular mass of claim 8 wherein said generator support means comprises a fork means in said opening for supporting said generator including a shaft journaled at its opposite ends to said frame means, a pair of cranks each secured at its center adjacent a respective end of said shaft and having a forwardly extending arm adapted to be secured to said generator and a rearwardly extending arm and double acting piston means arranged to pivot said cranks about the axis of said shaft whereby said forwardly extending arms are raised and lowered with respect to said frame means.

10. The vehicular mass of claim 9 further including crank frame means interconnecting said rearwardly extending crank arms, said double acting piston means being connected to said crank frame means and said first mentioned frame means.

References Cited by the Examiner
UNITED STATES PATENTS

| | | | |
|---|---|---|---|
| 3,024,861 | 3/1962 | Clynch | 181—.5 |
| 3,035,654 | 5/1962 | Nuttall et al. | 280—492 X |
| 3,106,982 | 10/1963 | Wade | 181—.5 |
| 3,120,398 | 2/1964 | Butterworth | 280—423 |
| 3,215,223 | 11/1965 | Kirby et al. | 181—.5 |

SAMUEL FEINBERG, *Primary Examiner.*

BENJAMIN A. BORCHELT, *Examiner.*

G. H. GLANZMAN, *Assistant Examiner.*